United States Patent [19]

Caine

[11] Patent Number: 5,497,304
[45] Date of Patent: Mar. 5, 1996

[54] SIDE WARNING LIGHTS

[76] Inventor: Harold A. Caine, 484 Kent Ct., Oceanside, N.Y. 11572

[21] Appl. No.: 412,731

[22] Filed: Mar. 29, 1995

[51] Int. Cl.⁶ ..................................................... B60Q 1/26
[52] U.S. Cl. .......................... 362/80; 362/83.3; 362/251; 340/477; 340/478; 340/469
[58] Field of Search ............................ 362/80, 83.3, 83, 362/82, 61, 251, 252; 340/475, 478, 469, 471, 472, 477

[56] References Cited

U.S. PATENT DOCUMENTS

| | | | |
|---|---|---|---|
| 2,193,063 | 3/1940 | Dettweiler | 362/80 |
| 2,203,502 | 6/1940 | Michel | 340/475 |
| 3,435,200 | 3/1969 | Massoll et al. | 362/83 |
| 3,456,153 | 7/1969 | Smith | 362/80 X |
| 3,840,851 | 10/1974 | Fowler et al. | 340/469 |
| 5,428,512 | 6/1995 | Mouzas | 362/80 |

*Primary Examiner*—Ira S. Lazarus
*Assistant Examiner*—Thomas M. Sember
*Attorney, Agent, or Firm*—Helfgott & Karas

[57] ABSTRACT

Side warning lights are provided for elongated motor vehicle such as a truck trailer or truck tanker combination. The side warning lights include first and second plurality of lights arranged on both sides of the vehicle. The lights are selectively energized so that under normal operating conditions one of the plurality of lights will be energized while under other operating conditions the other plurality of lights will be energized. The lights may be of different colors, such as red and yellow/amber. A third plurality of lights may be included which will operate in conjunction with the conventional directional turning lights of the vehicle. The purpose is to cause other drivers to perceive and respond soon to emergencies to thereby reduce collisions.

19 Claims, 3 Drawing Sheets

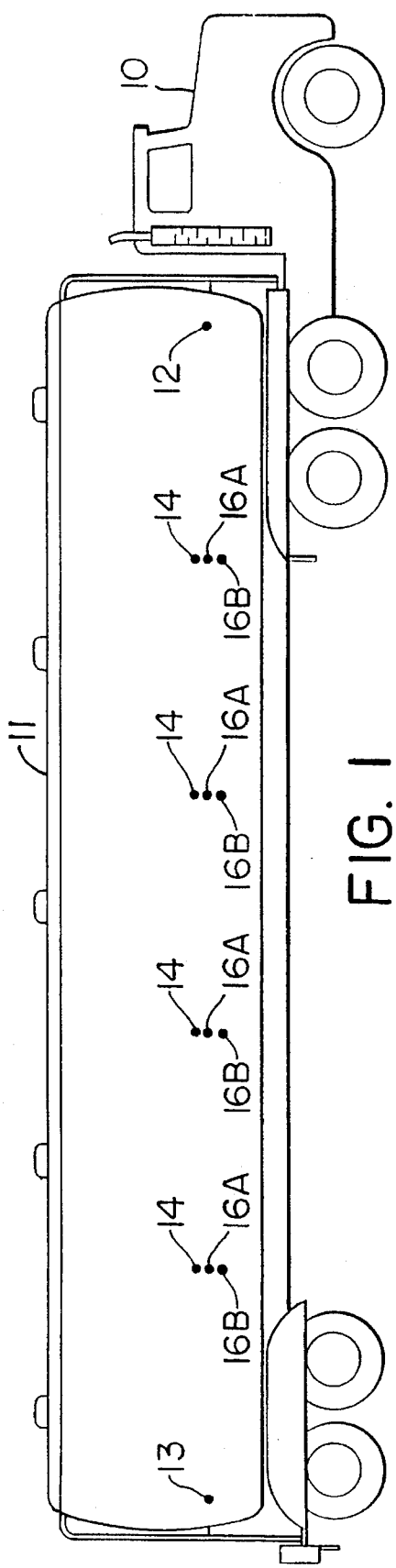

SIDE WARNING LIGHTS

BACKGROUND OF THE INVENTION

The present invention relates to warning lights used on motor vehicles. More particularly the present invention relates to side warning lights used on elongated motor vehicles such as truck trailer combinations, truck tanker combinations or buses, for example.

There has been a growing tendency to recognize the importance of having lights illuminated on automobiles and trucks even during the daylight hours. In various jurisdictions such as Sweden and Canada, for example, motor vehicles are required to be wired so that the lights are energized as soon as the ignition is turned on. It is not possible to start the engine of the motor vehicle without the lights being energized.

In automobiles, this generally applies to the headlights and sometimes to the brake lights as well. It has been recognized that when vehicles are approaching with the headlights on, the driver of an oncoming vehicle will more readily focus on the moving vehicle coming towards the driver. This is particularly important on long trips when the drivers may be fatigued. Also during twilight hours, many drivers do not realize that their vehicles are not easily visible to oncoming traffic without their headlights being turned on.

It has been recognized for many years that using reflective lights on the rear of motor vehicles at least permits a trailing vehicle to illuminate the reflectors of a vehicle in front even if the lights are not turned on. It has become increasingly important that vehicle lights be automatically energized even without the driver's action. It is very common to have sensors in motor vehicles which automatically turn on the headlights when the ambient light becomes lower than an acceptable minimum.

In recognizing these problems, U.S. Pat. No. 4,952,909 has been issued to the same inventors as the present application. This patent describes an early warning system which can anticipate the braking of a vehicle in front of another vehicle. The illustrated embodiment of the invention described in that patent provides a yellow/amber warning light closely adjacent to the high mounted center brake light now required on all vehicles manufactured to United States standards. It has been found that with such yellow/amber warning light the driver or drivers in the vehicles behind such motor vehicle will focus on the yellow/amber light that is on continuously. When the brake light is applied, the trailing drivers will readily notice the illumination of the braking light because, as described in that patent, the yellow/amber light will be deenergized and the red brake light will be energized. This change in light pattern is readily noticeable by drivers of trailing vehicles.

It is well known that saving even a fraction of a second in reaction time by early recognition of the braking of a vehicle in front of a trailing vehicle will prevent many rear end collisions.

The problems of course are magnified when elongated vehicles, such as buses, truck and trailers, truck and tankers, etc. are moving along the same highways with automobiles and other motor vehicles. This has already been recognized by the United States Department of Transportation by requiring running lights to be illuminated or energized at all times on such long trailers, by having yellow colored front running lights and red colored rear running lights.

In fact, vehicles over a prescribed length also require that an additional light be mounted on the side generally at the mid point between the front and rear running lights. The reason for this is that a large majority of accidents involving truck trailer and truck tanker combinations are collisions from the side. As an elongated vehicle proceeds through an intersection, the headlights of the truck, for example and even the front running lights, may be past the end of the intersection while the elongated body of the trailer or bus will still be in the intersection. A driver approaching at right angles to the path of the elongated vehicle will not always recognize that such vehicle is still in the intersection. This often can result in the approaching vehicle running into the side of the trailer of the truck trailer combination.

SUMMARY OF THE INVENTION

In view of the above, it is accordingly an object of the present invention to provide new and improved side warning lights for elongated motor vehicles.

It is a further object of the present invention to provide a lighting system for motor vehicles which will permit other drivers to become more quickly aware of such vehicle. This reduces the reaction time of such drivers enabling them to respond more quickly to emergency situations and provide earlier braking to stop short of a collision with the other vehicle.

It is another object of the present invention to provide side warning lights for elongated vehicles which will make it possible for drivers approaching from the side of the vehicle to readily ascertain the presence of the vehicle crossing perpendicularly to its path.

It is an object of the present invention to provide side warning lights, the illuminated intensity of which will vary in proportion to ambient light conditions for greater visibility to oncoming vehicles.

A further object of the present invention is to provide a plurality of lights of different colors so as to clearly mark the sides of such elongated vehicles.

In an improved version of the side warning lights, the different colored lights will be alternately energized under certain driving conditions.

Another object of the present invention is to provide side warning lights which are alternately energized and deenergized as the vehicle is turning.

With the above objects in mind, the present invention includes side warning lights for an elongated motor vehicle normally having running lights. A plurality of additional lights is provided, at least one of each of the additional lights being arranged respectively on opposite sides of the vehicle. Means are provided for selectively energizing the additional lights whereby the additional lights are energized whenever the running lights are energized, the additional lights emitting light of a certain intensity whenever they are energized. Finally, control means are provided for controlling the intensity of the light emitted by the additional lights.

In one embodiment of the present invention the intensity of the light of the additional lights decreases as the ambient light surrounding the motor vehicle decreases. The intensity increases as the ambient light increases.

In a further embodiment of the present invention, side warning lights are provided for an elongated motor vehicle having running lights, and including a first plurality of lights, at least one of each of the first plurality of lights being arranged respectively on opposite sides of the vehicle. A second plurality of lights is also included at least one of which is arranged on opposite sides of the vehicle. Means are included for selectively energizing the first and second plurality of lights so that whenever the running lights of the motor vehicle are energized, the first plurality of lights is energized until such time as the second plurality of lights is energized. At that time, the first plurality of lights is deenergized.

In an improved embodiment, the first plurality of lights will be colored yellow/amber and the second plurality of lights will be colored red.

A third plurality of additional lights may be included to operate in conjunction with the conventional directional turning lights of the vehicle.

A BRIEF DESCRIPTION OF THE DRAWING

The invention will be more clearly understood by reference to the following detailed description of an exemplary embodiment thereof in connection with the accompanying drawings in which:

FIG. 1 is a side elevational view of a truck tanker combination showing the side warning lights incorporating the principles of the present invention;

FIG. 2 is a table showing the pattern of energization of the lights of FIG. 1 under different vehicle running conditions;

DETAILED DESCRIPTION OF THE PREFERRED EMBODIMENTS

Figure 3:
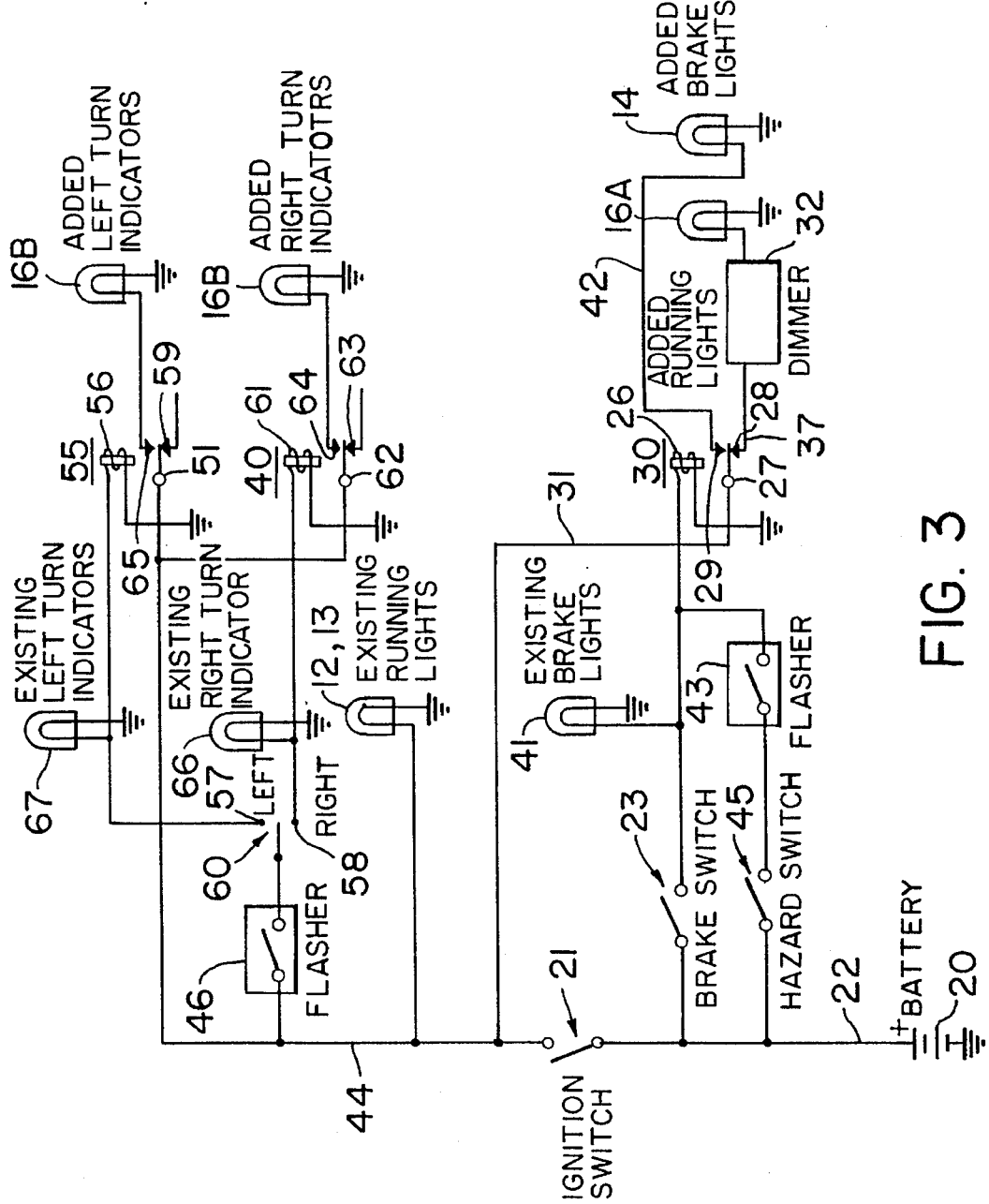
FIG. 3 is a schematic diagram showing how the description of the table of FIG. 2 may be achieved.

Referring now to FIG. 1, it can be seen that the elongated vehicle of FIG. 1 includes a truck 10 and a tanker or trailer 11. The trailer 11 is provided on its side with front running lights 12 and rear running lights 13. A plurality of upper side warning lights 14 is provided between the front and rear running lights 12 and 13.

Also mounted on the side of the tanker 11 are further or lower side warning lights 16A and 16B arranged between the front and rear running lights.

As noted above, the front running lights 12 are generally yellow/amber and the rear running lights 13 are generally red, depending on the particular jurisdiction. In accordance with the present invention, the side warning lights 14 are preferably red and the side warning lights 16A and 16B are preferably yellow/amber.

As noted above, it is an object of the present invention to provide side warning lights which can be readily recognized by vehicles approaching the trailer from the side.

In FIG. 2 is shown the table wherein the energizing of the various lamps illustrated in FIG. 1 is described. In the first line of the table, the elongated vehicle is running straight along the road. Under such conditions, the normal running lights 12 and 13 are on. The side warning lights 16A are also energized. However, the side warning lights 14 and 16B are off or deenergized. Thus, the elongated vehicle is proceeding along the road with front and side yellow/amber warning lights energized and the rear red running lights also energized.

In the second line of the table of FIG. 2, the vehicle is turning. The table indicates that the running lights 12, 13 and 16A will still be energized while the side warning lights 14 will still be off. However, the side warning lights 16B will now be flashing simultaneously with the turning lights on the rear of the trailer (not shown). That is, the side warning lights 16B which are preferably yellow/amber will be alternately energized and deenergized as the vehicle is turning in either direction.

When the vehicle is turning to the right which is the view shown in FIG. 1, the side warning lights 16B on the right hand side of the vehicle will be alternately energized and deenergized so that the lights will flash or blink in the same manner as turning lights on ordinary motor vehicles. When the vehicle is turning left, the side warning lights 16B on the left side of the trailer (not shown) will be alternately energized and deenergized in the same manner.

It is evident therefore, that such flashing side warning lights will be readily apparent to any vehicle approaching from the side since the flashing lights will make the elongated vehicle even more readily recognizable.

It should further be noted that under normal conditions the front and rear running lights 12 and 13 generally have an intensity of from 2–5 candela, which is about ½ to ⅓ of the intensity needed in the front or rear of the vehicle. As will be noted later, the side warning lights 16A can have a variable intensity which varies proportionately with the ambient light conditions. However, when the turning indicator is operated by the operator of the motor vehicle to indicate the imminent turning of the vehicle, the side warning lights 16B, which will also flash, will operate at their maximum intensity which can be substantially 16 candela.

In the third line of the table of FIG. 2, when the brake lights are applied for stopping the vehicle, the front and rear running lights 12 and 13 will still be energized. The side warning lights 14 will now also be energized while the side warning lights 16A and 16B will be off or deenergized. It should be noted that when the red lights 14 are energized the yellow/amber lights 16A are simultaneously deenergized. This provides a clear signal to vehicles approaching from any side angle that some change in running condition of the vehicle is happening. This greatly increases the perception of the driver of any approaching vehicles and adds greatly to the reduction of the reaction time of such drivers to any potential emergency.

In the fourth line of the table of FIG. 2, the vehicle is both turning and stopping. Thus, the brakes of a vehicle will be applied and the turning lever to operate the flasher switch will be moved to its energizing position. Under these conditions, the front and rear running lights 12 and 13 will continue to be energized. The side red warning lights 14 will be energized while the side yellow/amber warning lights 16A will be deenergized. The warning lights 16B will be flashing, controlled by the same flasher switch which alternately energizes and deenergizes the directional turning lights of the motor vehicle.

Thus, it can be seen that there will be greater visual recognition of the operation of the elongated motor vehicle in the direction in which the vehicle is moving. This will greatly decrease the reaction time of the operators of approaching motor vehicles from the rear.

In the last line of the table of FIG. 2, the hazard switch of the motor vehicle will be operated. It is known that such hazard switch will alternately energize and deenergize the side front and rear lights of most motor vehicles, especially tankers and trucks. With the arrangement described in the illustrated embodiment the front and rear running lights 12 and 13 will remain energized while the red and yellow/amber side warning lights 14 and 16A will alternately flash. That is, when the red lights 14 are energized, the yellow/amber lights 16A will be deenergized and vice versa. This will provide clear signals to any oncoming vehicles of the position of the elongated motor vehicle having the side warning lights in accordance with the principles of the present invention.

Referring now to FIG. 3, a schematic diagram for bringing about the operation described in the table of FIG. 2 will be explained.

In FIG. 3, a battery 20 is shown from which current is able to flow via an ignition switch 21 by means of the conductor 22. Also connected to the conductor 22, is a brake switch 23 which is connected to the existing brake lights 41 and to one end of a relay winding 26 of a relay 30. The other end of the relay winding 26 is connected to ground.

Relay 30 also includes a movable contact 27 controlled by the armature of relay 30. Movable contact 27 is normally connected to a relay contact 28. Relay 30 has a normally open contact 29. The movable contact 27 of the relay 30 is connected via a conductor 31 to the open end of the ignition switch 21. Also connected to the open end of the ignition switch 21 are the existing running lights 12 and 13 of the motor vehicle.

The normally closed contact 28 of the relay 30 is connected to the added warning lights 16A by means of a conductor 37 and a dimmer 32. The circuit diagram for the dimmer 32 will be disclosed subsequently with respect to FIG. 4.

The normally open contact 29 of the relay 30 is connected via a conductor 42 to the added side warning lights 14.

Also connected to one end of the relay winding 26 is a flasher 43 and a hazard switch 45. The other end of the hazard switch 45 is connected to the battery 20 via the conductor 22. The hazard switch 45 and the flasher 43 are conventional switches that are normally provided on motor vehicles. It is well known that in times of an emergency, closing of the hazard switch will cause the existing brake lights to flash intermittently. The flasher switch 43 is a conventional switch which opens and closes over some selected duty cycle. It should be noted that the hazard switch 43 can operate the conventional turning lights of a vehicle but this is not shown in FIG. 3 in order to avoid unnecessarily complicating the present drawing.

Also connected to the open end of the ignition switch 21 via a conductor 44, is one end of a second flasher 46. The other end of the flasher 46 is connected to a turn indicator switch 60.

The turn switch 60 is a conventional turn indicating switch generally in the form of a lever which is moved to the left to contact the terminal 57 in FIG. 3 or to the right to contact the terminal 58. Again, the flasher 46 and the turning switch 60 are conventional units normally found on motor vehicles constructed in accordance with United States standards.

The right of the switch terminal 58 is connected to the existing right turn indicator 66 and one end of a relay winding 61 of a relay 40. The other end of winding 61 is connected to ground. Relay 40 also includes a movable contact 62 controlled by the armature of the relay 40. Contact 62 is normally connected to a contact 63 and spaced from a normally open contact 64. The contact 64 of the relay 40 is connected to the added right turn indicators 16B.

Similarly, the left terminal 57 of the turning switch 60 is connected to the existing left turn indicators 67 and one end of a relay winding 56 of a relay 55. The relay 55 has a moveable contact 51 controlled by the armature thereof connected to the normally closed contact 59 and also includes a normally open contact of 65. The normally open contact 65 is connected to the added left turn indicators 16B.

Both the moveable contact 51 of the relay 55 and moveable contact 62 of the relay 40 are connected together to the conductor 44 so as to be connected to the battery 20 upon the closure of the ignition switch 21.

It should further be noted that the existing brake lights 41 and the existing right and left turn indicator lights 66 and 67 are not illustrated on FIG. 1 since they are hidden from view in this figure, but it is evident that they are arranged in the conventional manner on the truck trailer combination 10 and 11.

In operation, when the ignition switch 21 is closed, the existing running lights 12 and 13 are energized via the conductor 44. Also energized at this time are the added warning lights 16A by mean of the conductor 31 connected to conductor 44, the moveable contact 27 of the relay 30, the normally closed contact 28, the conductor 37 and the dimmer 32. As will be explained later, the intensity of the new lights 16A will be varied depending on the ambient light conditions surrounding the motor vehicle.

If the vehicle is to turn to the left, the turning lever of the switch 60 will be moved into contact with the left terminal 57 to energize the existing left turn indicators 67 via the flasher 46. Also energized will be the relay 55 to move the moveable contact 51 into contact with the normally open contact 65. Thus, the left turn indicators 16B and 67 will be directly connected via the flasher 46 and the closed ignition switch 21 to the battery 20. The flasher 46 will alternately energize and deenergize the left turn indicators 16B and 67 in the conventional manner. Note that these left turn indicators will be at their maximum intensity because they are directly connected to the battery 20.

Similarly when the lever of the switch 60 is moved in contact with the right terminal 58, the relay 40 and existing right turn indicators 66 will be energized via the flasher 46 and move the contact 62 into contact with the normally open contact 64. This will energize the added right turn indicators 16B. The indicators 16B, 66; 16B, 67; will be alternately energized and deenergized by the closing and opening of the flasher in the conventional manner.

Thus, in the situation of the first line of the table of FIG. 2, when the vehicle is running straight, the existing running lights 12 and 13 will be energized via the closed ignition switch 21. The existing and added brake lights 41 and 14 will be off since they are connected respectively to the open brake switch 23 and the normally open contact 29 of the relay 30. The added warning lights 16A will be on, being energized via the closed switch 21, the conductor 31, and the dimmer 32. Again it should be noted that the intensity of the running lights 16A will be determined by the dimmer switch 32, as will be subsequently explained.

In the second line of the Table of FIG. 2, when the vehicle is turning either to the left or right as discussed above, the existing running lights 12 and 13 will still be energized via closed ignition switch 21. The added right or left turn indicators 16B will be flashing depending on the direction of the turn as will the existing turning indicators 66 or 67. The added brake lights 14 will still be off and the added running lights 16A will still be energized via the dimmer 32 as noted above.

For the third line of the Table of FIG. 2, when the vehicle is stopping, the brake switch 23 will be closed. The existing brake lights 41 will be energized. The relay 30 will also be energized so that the moveable contact 27 will move into contact with the normally open contact 29 to energize the added brake lights 14 respectively via the conductor 42. Thus, the lights 12 and 13 will still be on and the lights 14 will be on. It should also be noted that when the relay 30 is energized, the normally closed contact 28 is now open due to the movement of the contact 27 and therefore, the warning lights 16A are no longer energized. They therefore will be off as noted in the fourth column of line 3 of the Table of FIG. 2 when the vehicle is stopping. The added turning lights 16B will be off since the turning switch 60 has not been activated.

For the fourth line of FIG. 2, when the vehicle is turning and stopping, the existing running lights 12 and 13 will still be energized. The brake switch 23 will be closed to energize the added and existing brake lights 14 and 41 as noted above. Since the vehicle is turning, the lever of the switch 60 will be connected to either the left terminal 57 or the right terminal 58 and the appropriate turn indicators 16B, 66 or 16B, 67 will be flashing by operation of the flasher switch 46 as discussed above. The added running lights 16A will be off since they are connected to the now open contact 28 of the relay 30.

Finally, in the fifth line of the table of FIG. 2, during high hazard conditions, the hazard switch 45 of FIG. 3 will be closed. This energizes the flasher switch 43 to alternately energize and deenergize the relay 30. During this cycle, the existing running lights 12 and 13 will still be on. The existing brake lights 41 will be energized whenever the flasher 43 is closed. At the same time, the relay 30 will be energized when the flasher is closed to move the contact 27 into contact with the normally open contact 29 and energize added brake lights 14.

At this same instant, the moveable contact 27 will be disconnected from the normally closed contact 28 and therefore the added warning lights 16A will be off. However, when the flasher 43 is open, the relay 30 will be deenergized, the contact 27 will move from contact 29 back to the normally closed contact 28. The added brake lights 14 will be off and the added warning lights 16A will be on.

Thus, the added brake lights 14 will be flashing on and off while the warning lights 16A will also be alternately flashing. That is, when the brake lights 14 are energized, the warning lights 16A will be deenergized. Similarly, when the warning lights 16A are energized, the brake lights 14 will be deenergized. Lights 16B are off since the turning switch 60 is not operated. It is clear therefore that this arrangement of flashing side warning lights of different colors will be readily recognizable to drivers approaching the moving vehicle from either side. Furthermore, it should be noted that the hazard switch 45 is normally arranged to also flash the lower beams of the vehicle. This circuitry is conventional and has been left out in order to avoid unnecessarily complicating the drawings.

Thus, it can be seen how the circuit of FIG. 3 carries out the operation set forth in the table of FIG. 2.

Figure 4:
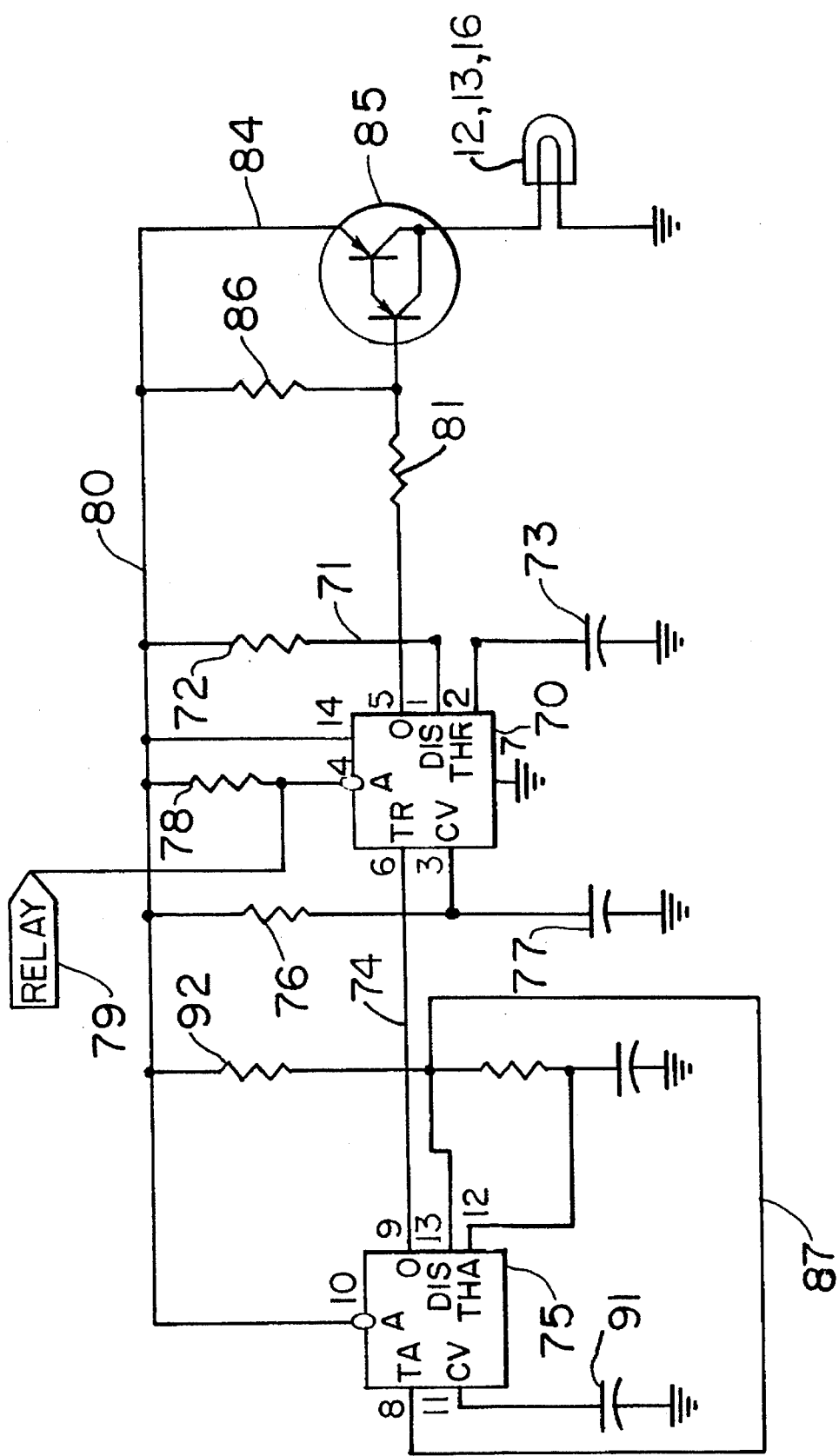
FIG. 4 is a schematic diagram showing how the intensity of the side warning lights is controlled.

Referring now to FIG. 4, the operation of the dimmer 32 of FIG. 3 will be explained. Dimmer 32 contains relaxation oscillators 70 and 75. These oscillators are provided in a single package and is commercially available as Texas Instruments precision timer NE 556. The oscillator 75 is provided as an oscillator having a short duty cycle in the order of 10% while the oscillator 70 is a one-shot multivibrator. In other words, both 70 and 75 may be multivibrators with 70 acting as a one shot multivibrator and 75 acting as an astable multivibrator.

The device 70 is provided with a terminal 1 connected to the 12 or 24 volt battery via a conductor 71 and a photo resistor 72. The photoresistor 72 is a photoconductive cell whose resistance varies with the illumination on the cell. Thus, the resistance of photoresistor 72 will vary with the ambient light surrounding the motor vehicle on which the dimmer is mounted.

Connected to a second terminal 2 of the element 70 is a capacitor 73, the other terminal of which is connected to ground. A terminal 7 of element 70 is connected to ground as well. The input terminal 6 of the one-shot multivibrator 70 is connected via a conductor 74 to the output terminal 9 of the astable multivibrator 75. Also connected to the one-shot multivibrator 70 via a terminal 3 is an RC circuit made up of a resistor 76 and a capacitor 77 connected between the 12 or 24 volt conductor 80 and ground.

A terminal 14 of the multivibrator 70 is connected directly to the 12 or 24 volt conductor 80 and a terminal 4 thereof is connected to the conductor 80 via a resistor 78. Also connected to the terminal 4 is a relay 79.

The output from the one-shot multivibrator 70 is taken from the output terminal 5 and applied via a resistor 81 to a power output stage 85 in the form of a Darlington amplifier. It can be seen that the output stage 85 is provided with PNP transistors so that a negative pulse applied to the base of the input transistor will turn on the output stage 85. Similarly, a positive pulse applied thereto will turn the output stage off.

Also connected to the input of the output stage 85 is a resistor 86 connected to the 12 or 24 volt conductor 80. The output stage in turn has the emitter of its output transistor connected to the conductor 80 via a conductor 84.

The oscillator 75 has its input terminal 8 connected to its terminal 13 via a conductor 87, the terminal 13 being connected to ground via a resistor 88 and a capacitor 89. Connected to the junction between resistor 88 and capacitor 89 is the terminal 12 of the oscillator 75.

The terminal 11 of oscillator 75 is connected to ground via a capacitor 91. The terminal 10 of the oscillator 75 is connected directly to the 12 or 24 volt conductor 80. Finally, connected to the terminal 13 of the oscillator 75 is the lower end of a resistor 92, the upper end of which is connected to the conductor 80. The terminal is thus connected to the junction or resistors 88 and 92.

It is well known that the operation of multivibrators or relaxation oscillators is controlled by the time constant of the coupled resistors and capacitors. The multivibrators 70 and 75 together with the associated resistors 76, 92 and 88 as well as the capacitors 91, 77, 73 and 89 generate a variable width pulse train which is controlled by the photoresistor 72.

In this arrangement, the resistance of the photoresistor 72 decreases with increased light. The oscillator 75 having a short duty cycle will have a pulse with negative going edge at its output terminal 9 for triggering the one-shot multivibrator 70, This will create a positive pulse at the output terminal 5 of multivibrator 70. The duration of this positive pulse is determined by the time constant of the capacitor 73 and the photoresistor 72. The brighter the light that is shining on the photoresistor 72, the shorter this positive pulse will become.

An output pulse from the multivibrator 70 will occur each time the oscillator 75 triggers the one-shot multivibrator 70. The arrangement for operational purposes is generally in the order of six times per second.

As noted above, the output power stage 85 will be turned on with a negative going signal and will be turned off with a positive signal. When a bright light is shining on the photoresistor 72, the output wave form will be mostly negative. When the ambient light is less, the output wave form will be mostly positive.

When a negative signal is applied to the input of the output stage 85, it will turn the controlled lamps 16A on. When the input to the stage 85 is positive, the controlled lamps 16A will be off. The apparent brightness of the lamps will be the ratio of the energized state (on) to deenergized state (off).

Since the lamps 16A are incandescent lamps or light emitting diodes, they will have a long persistence and the modulating frequency which is effectively turning them on and off will not be noticed. However, the apparent brightness will be controlled by the ratio of the on time to the off time.

Since the output stage 85 is being switched rather than operating in a linear mode, very little power is dissipated within the transistors of the stage 85 and consequently it will operate efficiently and not require elaborate heat sinking. The precise circuitry for the output stage 85 will be determined by the number of lamps that is to be controlled. Obviously, the more lamps to be controlled, the more current carrying capacity of the output stage 85 will be required. The same is true for the flasher switches 43 and 46 of FIG. 3.

It is also possible to use the circuit of the dimmer 32 to control the directional lights, for example, by grounding the pin 4 of the one-shot multivibrator 70. A relay 79 is shown for this purpose.

With the above arrangement, the dimmer circuit will sense the ambient light such as that coming from the sky and regulate the energy going to the lamps in proportion to the amount of the light that has been sensed. Thus, the brighter the daylight, the brighter the lamps. At night or in tunnels, the lamps would glow with reduced apparent brightness but would never be extinguished completely.

When the ambient light is very bright, the lights will glow almost as brightly as they would without the dimmer circuit controlling them. However, in order to maintain a linear control of the brightness, it is necessary to reduce the light output from the lamps by a few percent. Since these lamps vary in luminosity from one to another anyway, this does not pose any problem. If necessary, a higher candela lamp can be utilized.

It should be appreciated that by reducing the energy going to each of the lamps, the life of the lamp will be greatly increased.

From the above description, it is clear that the added side warning lights can be easily added to the electrical system of existing motor vehicles which are already required to have turning lights and hazard switches.

By providing the additional side warning lights which can be spaced from each other at chosen distances depending on the length of the vehicle, the overall reaction time of approaching drivers can be decreased sufficiently to avoid otherwise potential accident situations. For conventional truck-tanker combinations, the central pair of lights 14 illustrated in FIG. 1 can be approximately 8–10' apart. Other distances can be chosen depending on the height and length and shape of the elongated vehicle.

It should be noted that additional relays are provided for operating the additional side warning lights to minimize loading on the existing switches. As noted above, this makes it simpler for the apparatus incorporating the principles of the present invention to be easily adapted to electrical systems of existing motor vehicles as well as to be incorporated into motor vehicles that have been designed in the conventional manner. (i.e. OEM or after-market vehicles.)

Accordingly, although the instant invention has been described in connection with a highly specific exemplary embodiment thereof, it will be understood that many modifications and variations thereof will be readily available to those of ordinary skill in the art. Therefore it is manifestly intended that this invention be only limited by the claims and equivalents thereof.

What is claimed is:

1. Side warning lights for an elongated motor vehicle having running lights comprising:

a first plurality of lights, at least one of each of said first plurality of lights being arranged respectively on opposite sides of said vehicle;

a second plurality of lights, at least one of each of said second plurality of lights being arranged respectively on opposite sides of said vehicle; and means for selectively energizing said first and second plurality of lights whereby whenever said running lights are energized, said first plurality of lights are energized until said second plurality of lights are energized, at which time said first plurality of lights are deenergized.

2. Apparatus according to claim 1, wherein said running lights are front and rear running lights along each side of the vehicle and said first and second plurality of lights are arranged on the opposite sides of said vehicle between said front and rear running lights.

3. Apparatus according to claim 1, wherein said lights of said first plurality are a different color from said lights of said second plurality.

4. Apparatus according to claim 3, wherein said first plurality of lights are colored yellow/amber and said second plurality of lights are colored red.

5. Apparatus according to claim 1, wherein said vehicle has brakes and braking lights, said braking lights being energized whenever said brakes are applied and said second plurality of lights being energized whenever said braking lights are energized.

6. Apparatus according to claim 1, wherein said vehicle has turning indicator lights for each of said opposite sides thereof and a third plurality of lights, at least one of each of said third plurality of lights being arranged respectively on opposite sides of said vehicle, said lights of said third plurality on one of said sides are energized when said turning indicator lights on said one side are energized.

7. Apparatus according to claim 1, wherein said vehicle has hazard warning means which operate to alternately energize and deenergize said running lights and wherein at least some of said first plurality of lights are energized and deenergized when said hazard means are operated.

8. Apparatus according to claim 7, wherein at least some of said second plurality of lights are alternately energized and deenergized when said hazard means are operated.

9. Apparatus according to claim 1, wherein said first plurality of lights emits light of a certain intensity whenever they are energized and including control means for controlling the intensity of light emitted by said first plurality of lights.

10. Apparatus according to claim 9, wherein said control means lowers said intensity of light as the ambient light surrounding said first plurality of lights decreases and increases said intensity of light as said ambient light increases.

11. Apparatus according to claim 9, wherein said control means includes a photosensitive device.

12. Apparatus according to claim 6, wherein said first plurality of lights emits light of a certain intensity whenever they are energized and including control means for controlling the intensity of light emitted by said first plurality of lights.

13. Side warning lights for an elongated motor vehicle having running lights comprising:
   a plurality of additional lights, at least two of each of said additional lights being arranged respectively on opposite sides of said vehicle;
   means for selectively energizing said additional lights whereby at least a first number of said additional lights are energized with a certain intensity whenever said running lights are energized;
   control means for controlling said intensity of light emitted by said energized first number of additional lights, said first number of said additional lights remaining energized until the remainder of said additional lights are energized, at which time said first number of said additional lights are deenergized.

14. Apparatus according to claim 13, wherein said control means lowers said intensity of light as the ambient light surrounding said first number of additional lights decreases and increases said intensity of light as said ambient light increases.

15. Apparatus according to claim 13, wherein said vehicle has turning indicator lights for each of said opposite sides thereof and said first number of additional lights on one of said sides are energized when said turning indicator lights on said one side are energized.

16. Apparatus as claimed in claim 13, wherein said control means includes an oscillator having a short duty cycle and a one-shot multivibrator driven by said oscillator.

17. Apparatus as claimed in claim 9, wherein said control means includes an oscillator having a short duty cycle and a one-shot multivibrator driven by said oscillator.

18. Apparatus as claimed in claim 16, wherein the apparent intensity of said lights varies with the duty cycle of said oscillator.

19. Apparatus as claimed in claim 17, wherein the apparent intensity of said lights varies with the duty cycle of said oscillator.

* * * * *